(12) United States Patent
Webb (10) Patent No.: US 11,014,644 B2
(45) Date of Patent: May 25, 2021

(54) STIFFENED-CAVITY FOR MODULAR WRAP PLY ASSEMBLY FOR HAT STRINGER

(71) Applicant: THE BOEING COMPANY, Chicago, IL (US)

(72) Inventor: Sean C. Webb, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 460 days.

(21) Appl. No.: 15/792,896

(22) Filed: Oct. 25, 2017

(65) Prior Publication Data
US 2019/0118924 A1    Apr. 25, 2019

(51) Int. Cl.
| | | |
|---|---|---|
| *B64C 1/06* | (2006.01) |
| *B29C 70/30* | (2006.01) |
| *B29D 99/00* | (2010.01) |
| *B32B 5/02* | (2006.01) |
| *B64C 1/12* | (2006.01) |
| *B29L 31/30* | (2006.01) |

(52) U.S. Cl.
CPC .............. *B64C 1/064* (2013.01); *B29C 70/30* (2013.01); *B29D 99/0014* (2013.01); *B32B 5/02* (2013.01); *B29L 2031/3082* (2013.01); *B32B 2605/18* (2013.01); *B64C 1/12* (2013.01)

(58) Field of Classification Search
CPC .. B64C 1/064; B64C 1/12; B64C 3/18; B64C 3/182; B29C 70/30; B29D 99/0014; B32B 5/02; B32B 2605/18; B29L 2031/3082
See application file for complete search history.

(56) References Cited

U.S. PATENT DOCUMENTS

| | | | | |
|---|---|---|---|---|
| 6,151,743 | A * | 11/2000 | Church | B29C 53/585 |
| | | | | 14/73 |
| 7,879,276 | B2 * | 2/2011 | Guzman | B29C 70/086 |
| | | | | 264/248 |
| 8,419,402 | B2 * | 4/2013 | Guzman | B64C 1/064 |
| | | | | 425/110 |
| 8,617,687 | B2 * | 12/2013 | McCarville | B29C 70/865 |
| | | | | 428/117 |
| 8,714,485 | B2 | 5/2014 | Matheson et al. | |
| 2009/0127393 | A1 * | 5/2009 | Guzman | B29C 70/865 |
| | | | | 244/133 |
| 2010/0129589 | A1 | 5/2010 | Senibi et al. | |
| 2011/0027526 | A1 * | 2/2011 | McCarville | B29C 70/865 |
| | | | | 428/116 |

(Continued)

*Primary Examiner* — Philip J Bonzell
(74) *Attorney, Agent, or Firm* — Marshall, Gerstein & Borun LLP (57) ABSTRACT

A hat-shaped stringer includes wrap of at least one composite ply which includes cap portion and first flange which extends from a first side of the cap portion and second flange which extends from a second side of the cap portion, wherein the cap portion defines a recess positioned between the first and second flanges. Further included is a first composite wall which extends in a first direction along a first plane within the recess, wherein the first plane intersects the cap portion and intersects a skin positioned between the first and second flanges to which first and second flanges are secured and opposing sides of the first composite wall are spaced apart from the cap portion. First composite wall is connected to a second composite wall, which extends along the cap portion, are a portion, for example, of a triangular formation having radial portions.

20 Claims, 8 Drawing Sheets

(56) References Cited

U.S. PATENT DOCUMENTS

| | | |
|---|---|---|
| 2011/0088833 A1 | 4/2011 | Guzman et al. |
| 2011/0111183 A1* | 5/2011 | Guzman ................. B64C 1/064 |
| | | 428/188 |
| 2011/0139932 A1 | 6/2011 | Matheson et al. |
| 2011/0315824 A1* | 12/2011 | Pook ..................... B29C 70/443 |
| | | 244/133 |
| 2012/0097323 A1* | 4/2012 | Nitsch ................... B29C 70/086 |
| | | 156/212 |
| 2013/0089712 A1 | 4/2013 | Kwon et al. |
| 2014/0186588 A1* | 7/2014 | Victorazzo .............. B64C 1/064 |
| | | 428/178 |
| 2014/0216638 A1 | 8/2014 | Vetter et al. |
| 2014/0318705 A1* | 10/2014 | McCarville ............ B64C 1/064 |
| | | 156/307.1 |
| 2016/0089856 A1 | 3/2016 | Deobald et al. |

\* cited by examiner

STIFFENED-CAVITY FOR MODULAR WRAP PLY ASSEMBLY FOR HAT STRINGER

FIELD

This disclosure relates to composite hat-shaped stringers used in the reinforcement of skin structures of aircraft, and more particularly to composite hat-shaped stringers which have internal reinforcement positioned within the hat-shaped stringer.

BACKGROUND

Hat-shaped stringers are reinforcement structures which are connected to and provide stiffening to other structures such as skin structures of an aircraft. Skin structures are often used in the construction of portions of the aircraft such as a wing, fuselage or tail assembly. The hat-shaped stringers provide reinforcement or stiffening to the skin structure so as to resist bending, torsional and axial loads experienced by the skin structure from operational or maneuver loads of the aircraft. These loading conditions may require enhanced capabilities of the stringer to resist stringer pull off loads that may occur perpendicularly or in the out-of-plane directions relative to a length of the stringer. These loading conditions, for example, can arise from overpressure loads produced from a mass of fuel in wing tanks at maximum capacity. Maneuver loads may include inertial loads from movement of the fuel in the fuel tanks from inertia acting on the mass of the fuel during certain maneuvers of the aircraft. With respect to fuselage skin stiffening, out-of-plane loading conditions occur during certain flight conditions wherein the fuselage barrel is exposed to load coupling such that the structure sustains synchronized twist and bending from flight operational maneuvers.

Although a conventional hollow hat-shaped stringer cross-section is suited for nominal operational loading, there exists a need in the art for a hat-shaped stringer that will resist high pull of loads and have superior out-of-plane strength. This resistance and strength needs to be provided from within the internal cavity of a hat-shaped stringer so as to provide off-axis directional strength, provide overall strength and prevent collapse of the hat stinger in severely high loading conditions.

A trapezoidal cross sectional shaped wrap ply reinforcement assembly has been positioned internally within a cavity of the hat-shaped portion of the hat stringer. The trapezoidal-shaped structure provides a cavity of its own within the hat-shaped stringer cavity which is not positioned so as to optimally resist exceptional off-axis load lines encountered by the hat-shaped stringer. Moreover, the trapezoidal-shaped cross section has generally right angled corner turns positioned adjacent to the composite skin structure and the outer composite wrap of the hat-shaped stringer structure. This configuration is not favorable to providing a reduced void or space between the reinforcement assembly and the outer wrap of the hat-shaped stringer and the composite skin structure at the juncture area of the outer wrap of the hat-shaped stringer transitioning from a web section of the hat-shaped stringer to a shallow angle with the skin structure to which the flanges of the hat stringer overlie. Void or space areas are created. These void regions are susceptible to cracking due to stress concentrations and the constraining boundary conditions that exist. To prevent this occurrence, gap fillers are employed. Often times the material of the gap fillers is different from the surrounding composite wrap of the reinforcement assembly and/or outer wrap ply assemblies of the hat-shaped stringer resulting in the need to modify cure cycles, processing temperatures and pressures as well as percent of ply and resin matrix. This adds to cost and time to the manufacturing process. The filling of cavities or voids created by the geometries of the trapezoidal-shaped reinforcement assembly and the hat-shaped stringer involve manufacturing complexities that add to time and cost of fabrication. Optimizing the reduction of voids or cavities with more complimentary shaped reinforcement structures within a cavity of a hat stringer will simplify process flow, reduce cost, rework and waste.

SUMMARY

A hat-shaped stringer includes a wrap of at least one composite ply, including a cap portion and a first flange which extends from a first side the cap portion and a second flange which extends from a second side of the cap portion, wherein the cap portion defines a recess positioned between the first flange and the second flange. Further included is a first composite wall which extends in a first direction along a first plane within the recess, wherein the first plane intersects the cap portion and opposing sides of the first composite wall are spaced apart from the cap portion.

A method for fabricating a hat-shaped stringer, includes a step of laying up at least one composite ply forming a cap portion with a first flange extending from a first side of the cap portion and a second flange extending from a second side of the cap portion, wherein a recess is formed by the cap portion positioned between the first and second flanges. The method further includes a step of positioning a first composite wall which extends in a first direction along a first plane within the recess, wherein the first plane intersects the cap portion and opposing sides of the composite wall are spaced apart from the cap portion.

The features, functions, and advantages that have been discussed can be achieved independently in various embodiments or may be combined in yet other embodiments further details of which can be seen with reference to the following description and drawings.

DESCRIPTION

Figure 1:
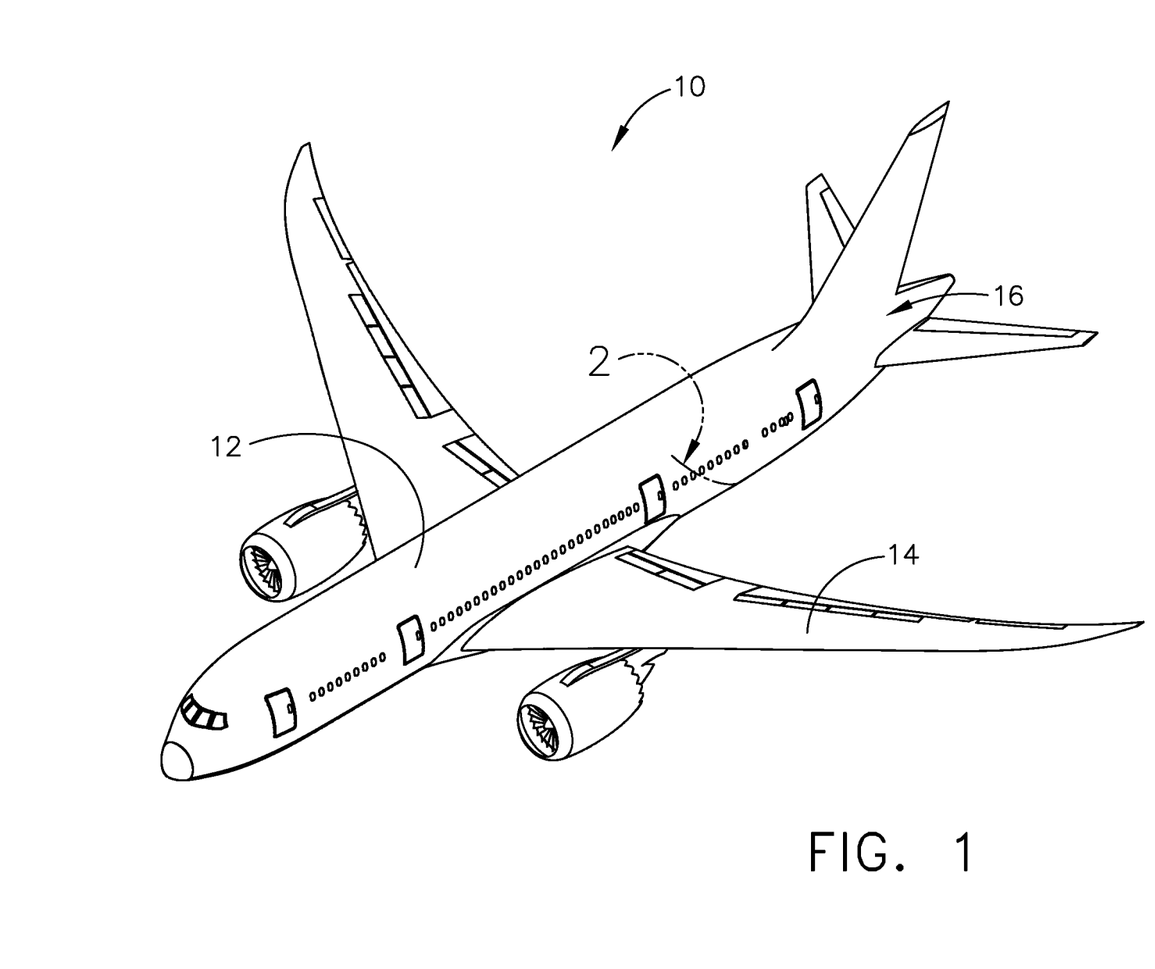
FIG. 1 is a perspective view of an aircraft.

In referring to FIG. 1, aircraft 10 is shown which is assembled with the use of reinforced structures such as utilizing composite hat-shaped stringers connected to composite skin structures. The hat-shaped stringers are used to provide stiffening to the skin structure so as to resist for example bending, torsional and axial loads experienced by the skin structure from operational and maneuver loads of aircraft 10. These loading conditions may require enhanced capabilities of the stringer so as to resist stringer pull off loads that may occur perpendicularly relative to the stringer or in the out-of-plane directions relative to a length of the stringer. The application of the hat-shaped stringer with respect to the skin structure of aircraft 10 can be utilized for example in fuselage assembly 12, wing assemblies 14 and tail assembly 16. An example of the employment of the hat-shaped stringer of this disclosure will be shown applied to the composite skin structure of fuselage 12 in location designated as 2 in FIG. 1.

Figure 2:
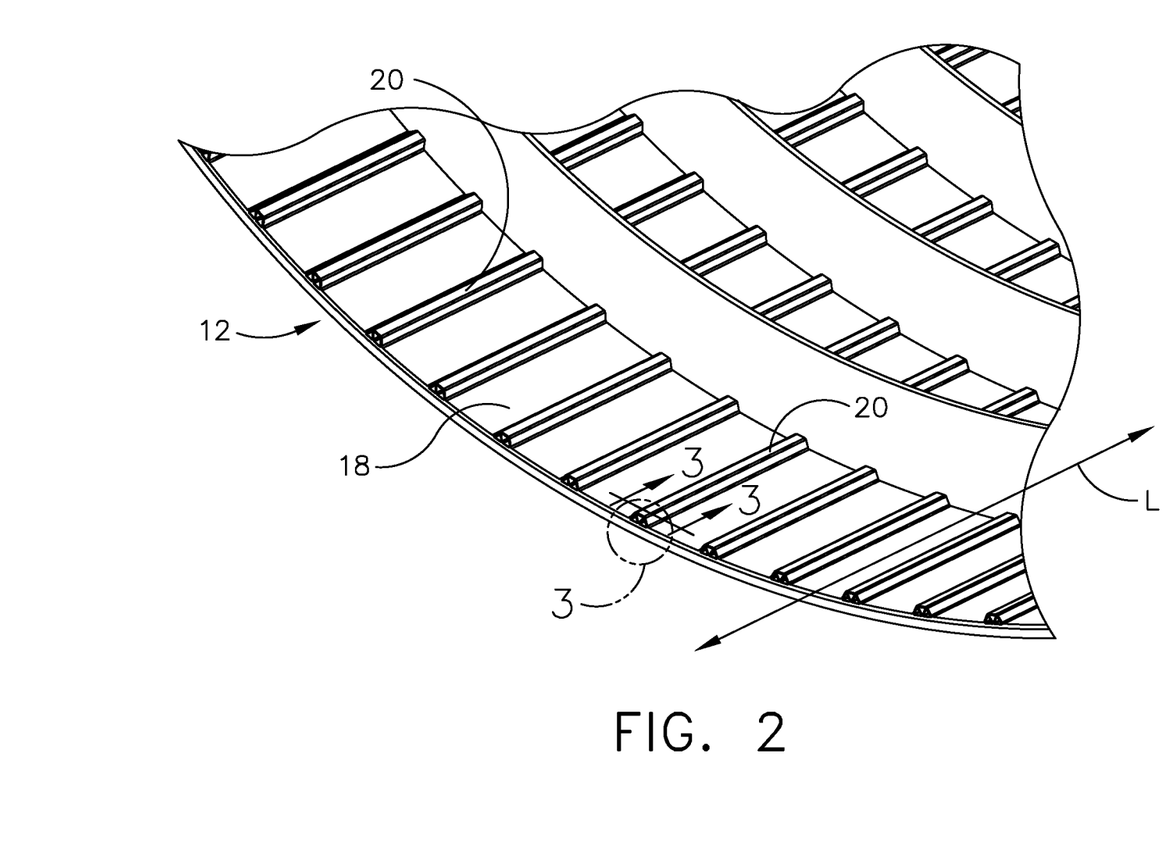
FIG. 2 is a perspective cut away view of a portion of the fuselage assembly structure of the aircraft in FIG. 1 in the location designated as 2.

In referring to FIG. 2, a portion of fuselage 12 composite skin structure 18, which is constructed of at least one composite ply 19 and in this example a plurality of composite plies, is shown. Positioned spaced apart and extending along a length L of fuselage 12 are hat-shaped stringers 20. Based on the structural support needed and the geometries of fuselage 12, in this example, the size of and angular direction in which hat-shaped stringers 20 extend along length L of fuselage 12 will be accordingly employed.

Figure 3:
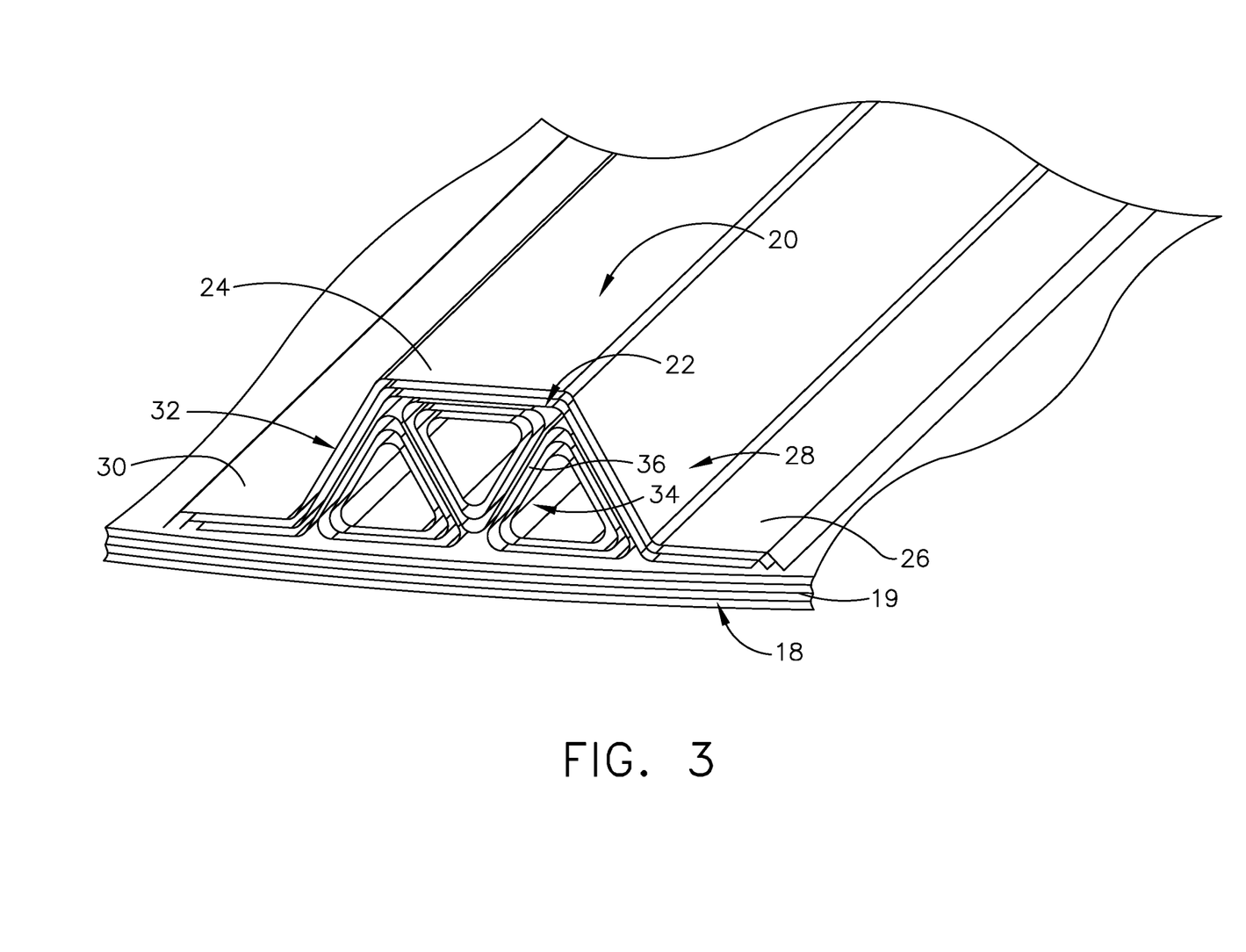
FIG. 3 is an enlarged perspective cross section schematic view along line 3-3 in FIG. 2 of a composite hat stringer and composite skin structure circled and designated as 3 in FIG. 2.
Figure 4:
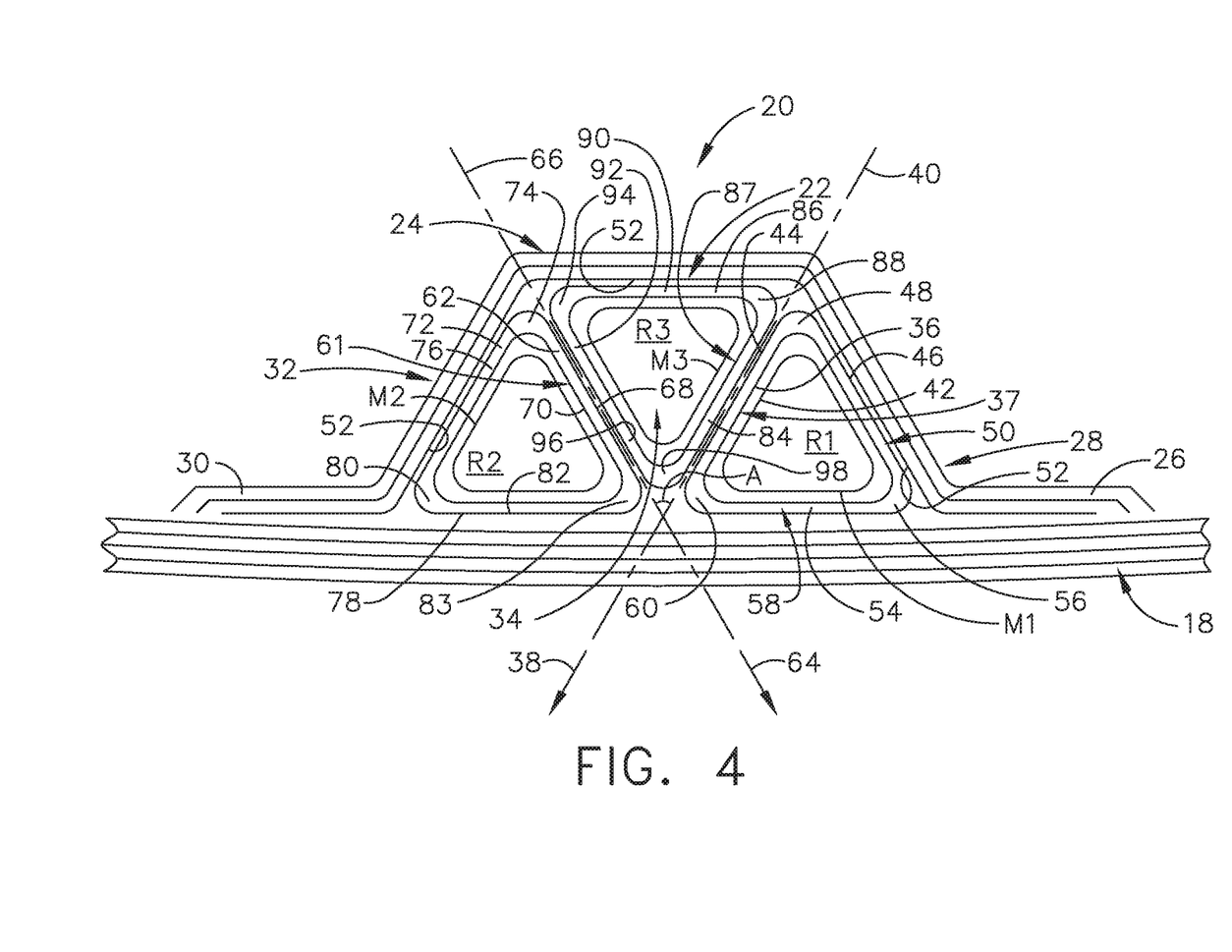
FIG. 4 is a front elevation view of the cross section view in FIG. 3.

In referring to FIGS. 3 and 4, a first embodiment of hat-shaped stringer 20 as designated at 3 in FIG. 2 is shown secured to composite skin structure 18. Hat-shaped stringer 20 includes at least one composite ply 22 and in this example includes a plurality composite plies which are positioned to form cap portion 24, as well as, first flange 26 which extends from first side 28 of cap portion 24 and second flange 30 which extends from second side 32 of cap portion 24. Cap portion 24 defines recess 34 positioned between first flange 26 and second flange 30. Hat-shaped stringer 20 further includes first composite wall 36 having first portion 37 which linearly extends in first direction 38 along first plane 40 within recess 34 as seen in FIG. 4. First plane 40 intersects cap portion 24. Opposing sides 42, 44 of first composite wall 36, which extends along first plane 40, are spaced apart from cap portion 24.

Hat-shaped stringer 20 further includes second composite wall 46 which includes first radial extending portion 48 which extends from linearly extending first portion 37 of first composite wall 36. Second portion 50 of second composite wall 46 extends linearly from first radial extending portion 48 and extends on and along interior surface 52 of cap portion 24. Hat-shaped stringer 20 further includes third composite wall 54 which includes second radial extending portion 56 which extends from linearly extending second portion 50 of second composite wall 46. Third portion 58 of third composite wall 54, which linearly extends from second radial extending portion 56 and extends on and along composite skin structure 18. Composite skin structure 18 extends between first and second flange 26, 30 and extends on and along the first and second flange 26, 30. Third radial extending portion 60 of third composite wall 54 extends from linearly extending third portion 58 of third composite wall 54 and extends to linearly extending first portion 37 of first composite wall 36.

Reinforcement assembly R1 includes first composite wall 36, second composite wall 46 and third composite wall 54, as described above, in this example, is further constructed to include a plurality of layers of composite ply material concentrically wrapped about first mandrel M1. In this embodiment, mandrel M1 is made of a composite material and remains in hat-shaped stringer 20 upon completion of fabricating hat-shaped stringer 20 and being co-cured with composite skin structure 18. In other examples the mandrel is removed upon completion of the co-cure of the hat-shaped stringer 20 and composite skin structure 18.

Hat-shaped stringer 20 further includes fourth composite wall 62 which includes linearly extending fourth portion 61 which extends in second direction 64 along second plane 66 within recess 34. Second plane 66 intersects cap portion 24 and opposing sides 68, 70 of fourth composite wall 62 are spaced apart from cap portion 24, as seen in FIG. 4. Second plane 66 is positioned in angular relationship to first plane 40 designated as A. Fifth composite wall 72 which includes fourth radial extending portion 74 which extends from linearly extending fourth portion 61 of fourth composite wall 62 and fifth portion 76 which extends linearly from fourth radial extending portion 74 and extends on and along interior surface 52 of cap portion 24. Sixth composite wall 78 includes fifth radial extending portion 80 which extends from linearly extending fifth portion 76 of fifth composite wall 70. Sixth portion 82 of sixth composite wall 78, which linearly extends from fifth radial extending portion 80 and extends on and along composite skin structure 18 wherein, as mentioned earlier, composite skin structure 18 extends between first and second flange 26, 30 and extends on and along first and second flange 26, 30. Sixth radial extending portion 83 of sixth composite wall 78 extends from linearly extending sixth portion 82 of sixth composite wall 78 to fourth portion of fourth composite wall 62.

Reinforcement assembly R2 of fourth composite wall 62, fifth composite wall 72 and sixth composite wall 78, as described above, in this example, is further constructed to include a plurality of layers of composite ply material concentrically wrapped about second mandrel M2. In this embodiment mandrel M2 is made of a composite material and remains in hat-shaped stringer 20 upon completion of fabricating hat-shaped stringer 20 and being co-cured with composite skin structure 18. In other examples, the mandrel is removed upon completion of the co-cure of the hat-shaped stringer 20 and composite skin structure 18.

Hat-shaped stringer 20 further includes seventh composite wall 84 having seventh portion 87 which linearly extends in first direction 38 along first plane 40 positioned on first composite wall 36. Eighth composite wall 86 which includes seventh radial extending portion 88 which extends from linearly extending seventh portion 87 of seventh composite wall 84 and eighth portion 90 which linearly extends from seventh radial extending portion 88 and extends on and along interior surface 52 of cap portion 24. Ninth composite wall 92 which includes eighth radial extending portion 94 which extends from the eighth portion 90 of eighth composite wall 86 to ninth portion 96 of ninth composite wall 92. Ninth portion 96 extends from eighth radial extending portion 94 and extends on and along fourth composite wall 62 to ninth radial extending portion 98 of ninth composite wall 92. Ninth radial extending portion 98 extends to seventh portion 87 of seventh composite wall 84.

Reinforcement assembly R3 includes seventh composite wall 84, eighth composite wall 86 and ninth composite wall 92, as described above, in this example, and is further constructed to include a plurality of layers of composite ply material concentrically wrapped about second mandrel M3. In this embodiment mandrel M3 is made of a composite material and remains in hat-shaped stringer 20 upon completion of fabricating hat-shaped stringer 20 and being co-cured with composite skin structure 18. In other examples, the mandrel is removed upon completion of the co-cure of the hat-shaped stringer 20 and composite skin structure 18.

In this example as seen in FIG. 4, first portion 37 of first composite wall 36, second portion 50 of second composite wall 46 and second portion 58 of third composite wall 54 are each the same length. Fourth portion 61 of fourth composite wall 62, fifth portion 76 of fifth composite wall 72 and sixth portion 82 of sixth composite wall 78 are also in this example each the same length. Similarly, seventh portion 87 of seventh composite wall 84, eighth portion 90 of eighth composite wall 86 and ninth portion 96 of ninth composite wall 92 are each the same length. This sizing provides in this example a compact assembly of reinforced assemblies R1, R2 and R3 which provides optimal reinforcement positioning within recess 34 of hat-shaped stringer 20.

In the present example as discussed herein, with generally equal length sides of reinforcement assemblies R1, R2 and R3 an acute angle of reinforcement assembly R1, for example, is positioned at a juncture of first flange 26 and cap portion 24 in contrast to a wider angle of approximately right angled corner turns of the trapezoidal reinforcement as discussed earlier with respect to the prior art. The more acute angled reinforcement provides reinforcement assembly such as R1 to more closely follow the transition of wrap 22 extending from cap portion 24 to first flange 26 and providing less of an opportunity to create larger voids within recess 34. Moreover, composite walls of reinforcement assemblies R1, R2 and R3 provide additional strength for hat-shaped stringer 20 with respect to pull off forces and off axis forces.

Hat-shaped stringer 20 in this example provides all reinforcement assemblies R1, R2 and R3 to be generally the same size in optimizing their positioning within recess 34 such that first portion 37 of first composite wall 36, second portion 50 of second composite wall 46, third portion 58 of third composite wall 54, fourth portion 61 of fourth composite wall 62, fifth portion 76 of fifth composite wall 72, sixth portion 82 of sixth composite wall 78, seventh portion 87 of seventh composite wall 84, eighth portion 90 of eighth composite wall 86 and ninth portion 96 of ninth composite wall 92 are each the same length.

Figure 5:
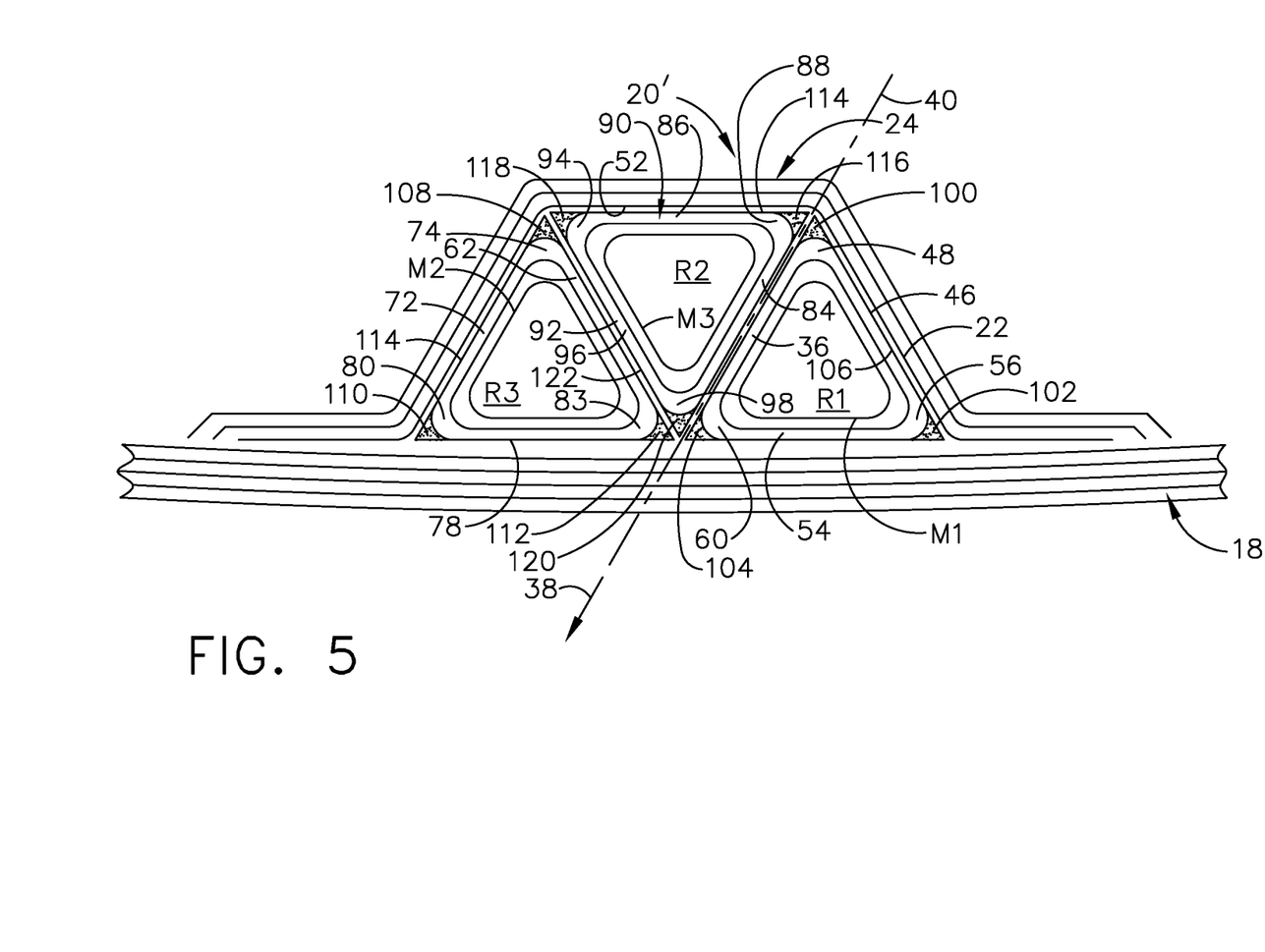
FIG. 5 is a cross section view of FIG. 4 of a second embodiment of the hat-shaped stringer assembly and skin structure.

In referring to FIG. 5, a second embodiment of hat-shaped stringer 20' follows the same constructions as discussed above for reinforcement assemblies R1, R2 and R3 except for having the additional structural features which will be discussed below. First radius filler 100 is positioned adjacent to first radial extending portion 48 of second composite wall 46. Second radius filler 102 is positioned adjacent to second radial extending portion 56 of third composite wall 54. Third radius filler positioned 104 is positioned adjacent to third radial extending portion 60 of third composite wall 54. In addition, a first at least one composite ply 106 is wrapped around first composite wall 36, first radius filler 100, second composite wall 46, second radius filler 102, third composite wall 54 and third radius filler 104. The addition of first, second and third radius fillers 100, 102 and 104 along with first at least one composite ply 106 being wrapped around these radius fillers and composite walls provide for benefits of additional strength and reduction in cracking in relationship to hat-shaped stringer 20'.

Second embodiment of hat-shaped stringer 20' further includes fourth radius filler 108 is positioned adjacent to first radial extending portion 74 of fifth composite wall 72. Fifth radius filler 110 is positioned adjacent to second radial extending portion 80 of sixth composite wall 78. Sixth radius filler 112 is positioned adjacent to third radial extending portion 83 of sixth composite wall 78. In addition, a second at least one composite ply 114 is wrapped around fourth composite wall 62, fourth radius filler 108, fifth composite wall 72, fifth radius filler 110, sixth composite wall 78 and sixth radius filler 112. The addition of fourth, fifth and sixth radius fillers 108, 110, and 112 along with second at least one composite ply 114 being wrapped around these radius fillers and composite walls provides for benefits of additional strength and reduction in cracking in relationship to hat-shaped stringer 20'.

Second embodiment of hat-shaped stringer 20' further includes seventh radius filler 116 is positioned adjacent to first radial extending portion 88 of eighth composite wall 86. Eighth radius filler 118 is positioned adjacent to second radial extending portion 94 of ninth composite wall 92. Ninth radius filler 120 is positioned adjacent to third radial extending portion 98 of ninth composite wall 92. In addition, a third at least one composite ply 122 is wrapped around seventh composite wall 84, seventh radius filler 116, eighth composite wall 86, eighth radius filler 118, ninth composite wall 92 and ninth radius filler 120. The addition of seventh, eighth and ninth radius fillers 116, 118 and 120 along with third at least one composite ply 122 being wrapped around these radius fillers and composite walls provides for the benefits of additional strength and reduction in cracking in relationship to hat-shaped stringer 20'.

Figure 6:
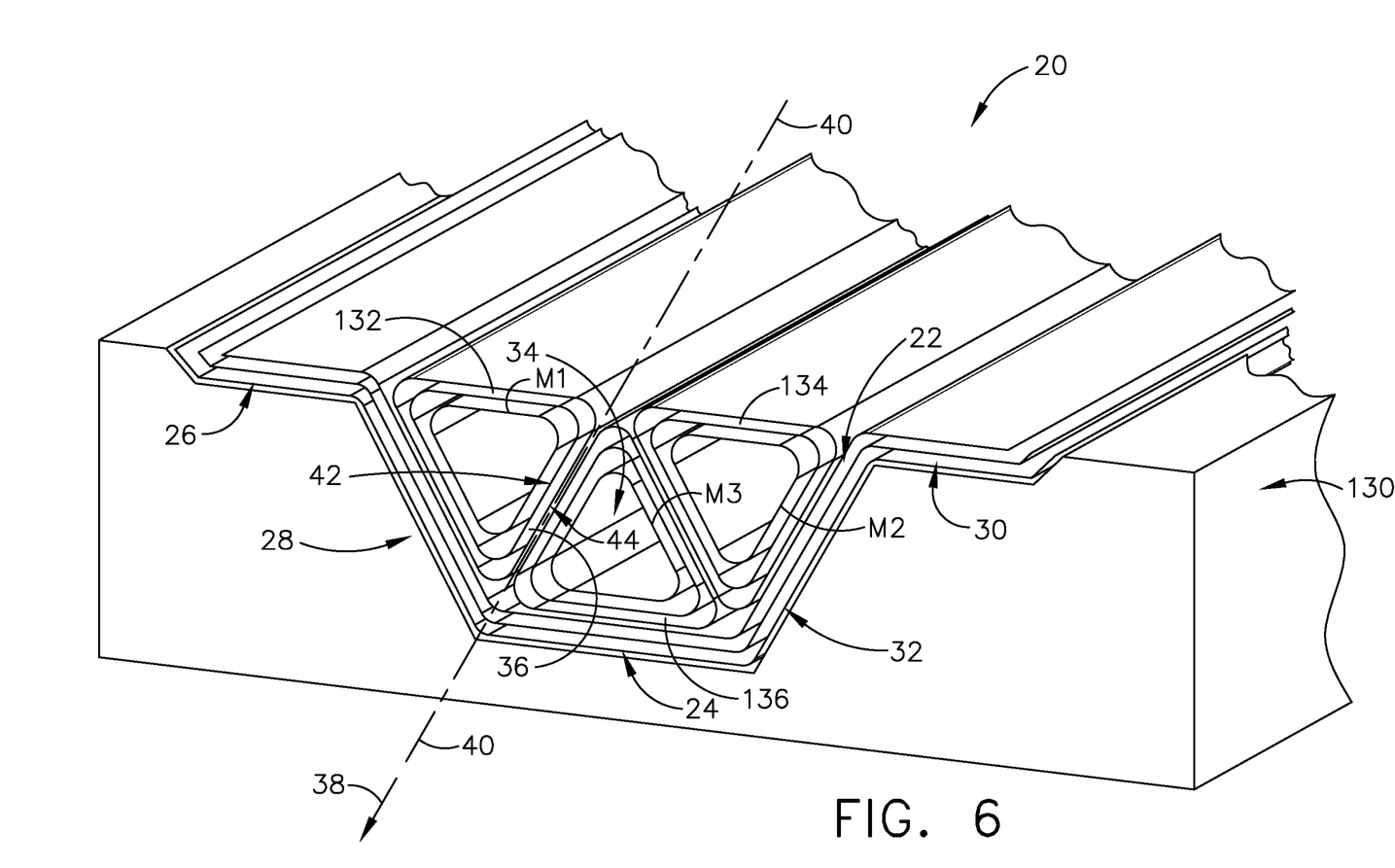
FIG. 6 is a perspective cross section view of a wrap of at least one composite ply in the fabrication of the first embodiment of the hat-shaped stringer of FIG. 3 positioned within a support tool wherein composite reinforcement assemblies are positioned within a recess of a cap portion of the hat stringer.
Figure 7:
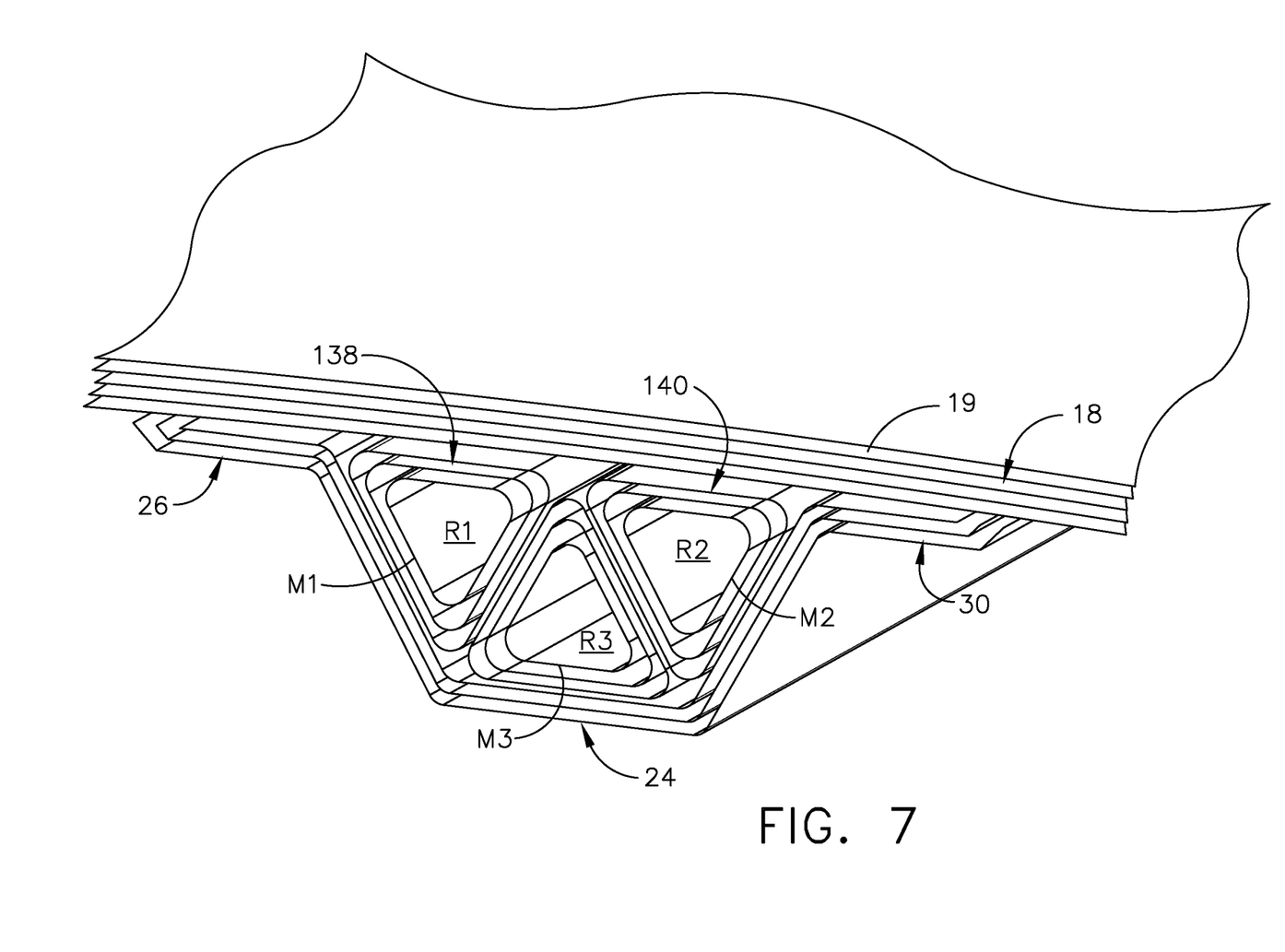
FIG. 7 is the perspective cross section view in FIG. 6 without a support tool and with composite plies of a skin structure positioned in overlying position to first and second flanges of the hat-shaped stringer and the reinforcement assemblies.
Figure 8:
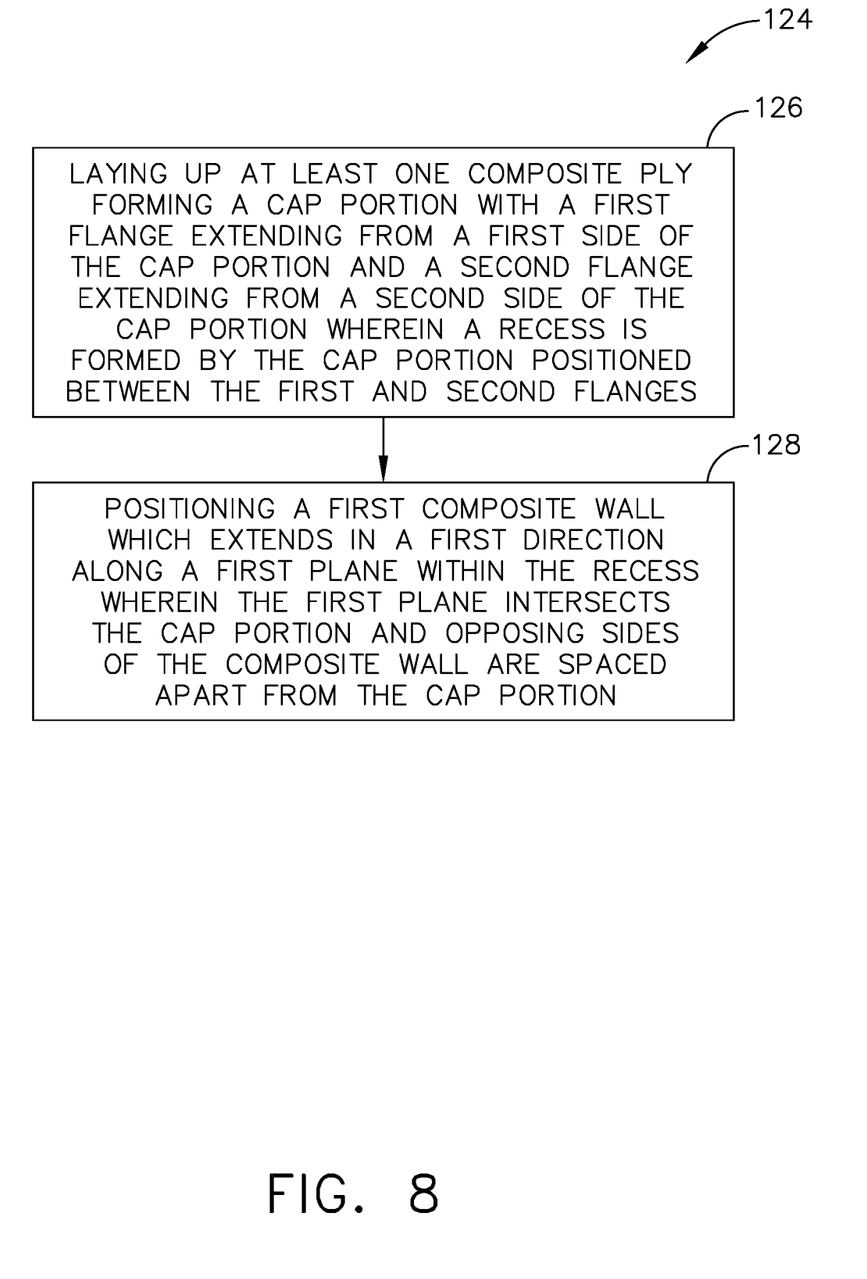
FIG. 8 is flow chart of method for assembling of the hat-shaped stringer.

Method 124 for fabricating a hat-shaped stringer 20, as shown in FIGS. 6-8, includes step 126 of laying up at least one composite ply 22, as seen in FIG. 6, wherein the at least one composite ply 22 is positioned on a support tool 130 forming cap portion 24 with first flange 26 extending from first side 28 of cap portion 24 and second flange 30 extending from second side 32 of cap portion 24 wherein recess 34 is formed by cap portion 24 positioned between first and second flanges 26, 30. Method 124 further includes step 128 of positioning first composite wall 36 which extends in first direction 38 along first plane 40 within recess 34. First plane 40 intersects cap portion 24 and opposing sides 42, 44 of first composite wall 36 are spaced apart from cap portion 24.

Step 128 of positioning composite wall 36 along first plane 40 within recess 34 further includes steps of: wrapping fourth at least one composite ply 132 about a triangularly shaped first mandrel M1; wrapping fifth at least one composite ply 134 about a triangularly shaped second mandrel M2; and wrapping sixth at least one composite ply 136 about a triangularly shaped third mandrel M3. Further included in step 128 includes positioning wrapped first mandrel M1, wrapped second mandrel M2 and wrapped third mandrel M3 into recess 34 of cap portion 24.

In referring to FIG. 7, method 124 further includes laying up seventh at least one composite ply for composite skin structure 18 onto first flange 26, second flange 30, the fourth at least one composite ply 132 positioned on side 138 of the triangularly shaped first mandrel M1 and fifth at least one composite ply 134 positioned on side 140 of the triangularly shaped second mandrel M2.

Method 124 further includes a step of co-curing the at least one composite ply 22 of cap portion 24 and first and second flanges 26, 30, the at least one composite ply 132, 134 and 136 positioned about triangularly shaped first, second and third mandrels M1, M2 and M3 respectively and the seventh at least one composite ply 19 of composite skin structure 18.

While various embodiments have been described above, this disclosure is not intended to be limited thereto. Variations can be made to the disclosed embodiments that are still within the scope of the appended claims.

What is claimed:

1. A hat-shaped stringer, comprising:
a wrap of at least one composite ply, including:
a cap portion; and
a first flange which extends from a first side of the cap portion and a second flange which extends from a second side of the cap portion, wherein the cap portion defines a recess positioned between the first flange and the second flange; and
a first composite wall which extends linearly in a first direction along a first plane within the recess, wherein:
the first plane intersects the cap portion and intersects a skin positioned between the first and second flanges to which first and second flanges are secured;
opposing sides of the first composite wall are spaced apart from the cap portion; and
the first composite wall is connected to a second composite wall with the first composite wall connected to a first radial extending portion of the second composite wall; and
the second composite wall extends along an interior surface of the cap portion and is connected to a second radial extending portion of a third composite wall, wherein:
a first radius filler is positioned adjacent to the first radial extending portion of the second composite wall;
a first at least one composite ply extends along the first composite wall and extends from the first composite wall, such that, the at least one composite ply with the first radial extending portion of the second composite wall surrounds the first radius filler; and
the at least one composite ply extends along the second composite wall.

2. The hat-shaped stringer of claim 1, further including the at least one composite ply extends between the second composite wall and the cap portion.

3. The hat-shaped stringer of claim 2, further includes:
a second portion of the third composite wall extends from the second radial extending portion of the third composite wall;
the second portion of the third composite wall extends along a composite skin structure, wherein the composite skin structure extends between the first and second flange and extends along the first and second flange; and
a third radial extending portion of the third composite wall extends from the second portion of the third composite wall to the first composite wall.

4. The hat-shaped stringer of claim 3, further includes a fourth composite wall, which extends in a second direction along a second plane within the recess, wherein:
the second plane intersects the cap portion;
opposing sides of the fourth composite wall are spaced apart from the cap portion; and
the second plane is positioned in angular relationship to the first plane.

5. The hat-shaped stringer of claim 4, further includes a fifth composite wall, which includes a first radial extending portion, which extends from a second portion the fifth composite wall to the fourth composite wall wherein the second portion of the fifth composite wall extends, from the first radial extending portion, along the interior surface of the cap portion.

6. The hat-shaped stringer of claim 5, further includes:
a sixth composite wall includes a second radial extending portion, which extends from the second portion of the fifth composite wall;
a second portion of the sixth composite wall extends from the second radial extending portion and extends along the composite skin structure; and
a third radial extending portion of the sixth composite wall extends from the second portion of the sixth composite wall to the fourth composite wall.

7. The hat-shaped stringer of claim 6, further includes:
a seventh composite wall extends in the first direction along the first plane positioned along the first composite wall;
an eighth composite wall which includes a first radial extending portion, which extends from the seventh composite wall, and the eighth composite wall includes a second portion which extends from the first radial extending portion of the eighth composite wall and extends along the interior surface of the cap portion; and
a ninth composite wall, which includes a second radial extending portion, which extends from the second portion of the eighth composite wall to a second portion of the ninth composite wall, wherein:
the second portion of the ninth composite wall, extends from the second radial extending portion and extends on and along the fourth composite wall along the second plane to a third radial extending portion of the ninth composite wall; and
the third radial extending portion extends to the seventh composite wall.

8. The hat-shaped stringer of claim 7, wherein:
the first composite wall, the second portion of the second composite wall and the second portion of the third composite wall are each a same length;
the fourth composite wall, the second portion of the fifth composite wall and the second portion of the sixth composite wall are each a same length; and
the seventh composite wall, the second portion of the eighth composite wall, and the second portion of the ninth composite wall are each a same length.

9. The hat-shaped stringer of claim 8, wherein the first composite wall, the second portion of the second composite wall, the second portion of the third composite wall, the fourth composite wall, the second portion of the fifth composite wall, the second portion of the sixth composite wall, the seventh composite wall, the second portion of the eighth composite wall and the second portion of the ninth composite wall are each a same length.

10. The hat-shaped stringer of claim 3, further includes:
a second radius filler positioned adjacent to the second radial extending portion of the third composite wall; and
a third radius filler positioned adjacent to the third radial extending portion of the third composite wall.

11. The hat-shaped stringer of claim 10, wherein the the first at least one composite ply wraps around the first composite wall, first radius filler, the second composite wall, the second radius filler, the third composite wall, and the third radius filler.

12. The hat-shaped stringer of claim 6, further including:
a fourth radius filler positioned adjacent to the first radial extending portion of the fifth composite wall;

a fifth radius filler positioned adjacent to the second radial extending portion of the sixth composite wall; and a sixth radius filler positioned adjacent to the third radial extending portion of the sixth composite wall.

13. The hat-shaped stringer of claim 12, wherein a second at least one composite ply wraps around the fourth composite wall, the fourth radius filler, the fifth composite wall, the fifth radius filler, the sixth composite wall, and the sixth radius filler.

14. The hat-shaped stringer of claim 7, further including:

a seventh radius filler positioned adjacent to the first radial extending portion of the eighth composite wall;

an eighth radius filler positioned adjacent to the second radial extending portion of the ninth composite wall; and a ninth radius filler positioned adjacent to the third radial extending portion of the ninth composite wall.

15. The hat-shaped stringer of claim 14, wherein a third at least one composite ply wraps around the seventh composite wall, the seventh radius filler, the eighth composite wall, the eighth radius filler, the ninth composite wall, and the ninth radius filler.

16. A method for fabricating a hat-shaped stringer, comprising steps of:

laying up an at least one composite ply forming a cap portion with a first flange extending from a first side of the cap portion and a second flange extending from a second side of the cap portion, wherein a recess is formed by the cap portion positioned between the first and second flanges; and positioning a first composite wall which extends linearly in a first direction along a first plane within the recess, wherein:

the first plane intersects the cap portion and intersects a skin positioned between the first and second flanges to which first and second flanges are secured;

opposing sides of the first composite wall are spaced apart from the cap portion;

the first composite wall is connected to a second composite wall with the first composite wall connected to a first radial extending portion of the second composite wall; and the second composite wall extends along an interior surface of the cap portion and is connected to a second radial extending portion of a third composite wall, wherein:

a first radius filler is positioned adjacent to the first radial extending portion of the second composite wall;

a first at least one composite ply extends along the first composite wall and extends from the first composite wall, such that, the at least one composite ply with the first radial extending portion of the second composite wall surrounds the first radius filler, and the at least one composite ply extends along the second composite wall.

17. The method of claim 16, wherein the step of positioning a composite wall along a first plane within the recess, includes steps of:

wrapping a fourth at least one composite ply about a triangularly shaped first mandrel;

wrapping a fifth at least one composite ply about a triangularly shaped second mandrel; and wrapping a sixth at least one composite ply about a triangularly shaped third mandrel.

18. The method of claim 17, wherein the step of positioning a first composite wall includes positioning a wrapped first mandrel, a wrapped second mandrel and a wrapped third mandrel into the recess of the cap portion.

19. The method of claim 18, further includes laying up a seventh at least one composite ply for a composite skin structure along the first flange, the second flange, the fourth at least one composite ply positioned on a side of the triangularly shaped first mandrel and the fifth at least one composite ply positioned on a side of the triangularly shaped second mandrel.

20. The method of claim 19, further comprising co-curing the at least one composite ply of the cap portion and the first and second flanges, the fourth, fifth, and sixth at least one composite ply positioned about each of the triangularly shaped first, second, and third mandrels, respectively, in which a first, second, and third at least one composite ply is positioned, respectively, wrapped around the fourth, fifth and sixth at least one composite ply, which are wrapped around the first, second and third mandrel, respectively, and the seventh at least one ply for the composite skin structure.

* * * * *

UNITED STATES PATENT AND TRADEMARK OFFICE
CERTIFICATE OF CORRECTION

PATENT NO. : 11,014,644 B2  
APPLICATION NO. : 15/792896  
DATED : May 25, 2021  
INVENTOR(S) : Sean C. Webb Page 1 of 1

It is certified that error appears in the above-identified patent and that said Letters Patent is hereby corrected as shown below:

In the Claims

At Column 7, Line 66, "portion the" should be -- portion of the --.

At Column 7, Line 67, "wall wherein" should be -- wall, wherein --.

At Column 8, Line 60, "the the" should be -- the --.

At Column 10, Line 9, "filler, and" should be -- filler; and --.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*